(12) United States Patent
Lee

(10) Patent No.: US 9,015,462 B2
(45) Date of Patent: Apr. 21, 2015

(54) DISPLAY DEVICE AND BOOTING METHOD THEREOF

(75) Inventor: Seok-jae Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 13/593,785

(22) Filed: Aug. 24, 2012

(65) Prior Publication Data

US 2013/0054954 A1    Feb. 28, 2013

(30) Foreign Application Priority Data

Aug. 30, 2011    (KR) .................... 10-2011-0087172

(51) Int. Cl.
| | |
|---|---|
| *G06F 9/00* | (2006.01) |
| *G06F 15/177* | (2006.01) |
| *H04N 7/173* | (2011.01) |
| *H04N 21/422* | (2011.01) |
| *H04N 21/443* | (2011.01) |
| *H04N 5/445* | (2011.01) |

(52) U.S. Cl.
CPC ..... *H04N 21/42204* (2013.01); *H04N 21/4432* (2013.01); *H04N 5/44582* (2013.01)

(58) Field of Classification Search
CPC ................................... G06F 9/4401
USPC ................................................ 713/2
See application file for complete search history.

(56) References Cited

U.S. PATENT DOCUMENTS

| | | | | |
|---|---|---|---|---|
| 5,438,377 | A | * | 8/1995 | Chang ........................... 348/731 |
| 5,818,935 | A | * | 10/1998 | Maa ............................... 380/200 |
| 5,838,383 | A | * | 11/1998 | Chimoto et al. .............. 348/553 |
| 6,507,906 | B1 | | 1/2003 | Criddle et al. |
| 6,774,926 | B1 | * | 8/2004 | Ellis et al. ................... 348/14.01 |
| 7,257,702 | B2 | * | 8/2007 | Yamada et al. .................... 713/2 |
| 7,590,998 | B2 | * | 9/2009 | Hanley ........................... 725/112 |
| 2002/0190797 | A1 | | 12/2002 | Deppe et al. |
| 2005/0253823 | A1 | | 11/2005 | Kazama et al. |
| 2007/0206211 | A1 | | 9/2007 | Okutsu et al. |
| 2011/0007145 | A1 | | 1/2011 | Shigeeda |
| 2011/0143160 | A1 | | 6/2011 | Barguet et al. |

FOREIGN PATENT DOCUMENTS

| | | | |
|---|---|---|---|
| EP | 1926310 | A1 | 5/2008 |
| KR | 10-2011-0066685 | A | 6/2011 |

OTHER PUBLICATIONS

Communication dated Jul. 27, 2012 from the European Patent Office in counterpart European application No. 12161851.6.
Communication dated Mar. 3, 2015 issued by the European Patent Office in counterpart European Patent Application No. 12 161 851.6.

* cited by examiner

*Primary Examiner* — Suresh Suryawanshi
(74) *Attorney, Agent, or Firm* — Sughrue Mion, PLLC

(57) ABSTRACT

A display device and a booting method thereof are provided. The booting method includes during a standby mode, receiving a remote control signal and storing the remote control signal; and in response to a power signal being received within a predefined period of time of the receipt of the remote control signal, booting the display device to display a display screen corresponding to the remote control signal. Therefore, it is possible for a user to readily execute a desired function of the display device when booting the display device.

20 Claims, 10 Drawing Sheets

310-3

310-4

DISPLAY DEVICE AND BOOTING METHOD THEREOF

CROSS-REFERENCE TO RELATED PATENT APPLICATION

This application claims priority under 35 U.S.C. §119 from Korean Patent Application No. 10-2011-0087172, filed on Aug. 30, 2011, in the Korean Intellectual Property Office, the disclosure of which is incorporated herein by reference in its entirety.

BACKGROUND

1. Field

Apparatuses and methods consistent with exemplary embodiments relate to a display device and a booting method thereof, and more particularly, to a display device which displays a display screen for providing a function desired by a user when being booted, and a booting method of the display device.

2. Description of the Related Art

Related-art televisions (TVs) simply receive and output broadcast signals from broadcast channels provided by broadcasting stations. However, the development of technology has opened the way for TVs capable of providing a variety of functions other than a simple broadcast reception function, such as a web search function, an application provision function, a content provision function and the like.

To execute the above-mentioned functions with an existing TV, it is necessary to boot the TV first and to perform additional operations. For example, to execute an application using a TV, it is necessary to boot the TV first and to execute an application in response to the receipt of a user command with a broadcast reception screen displayed on the TV.

Therefore, even in a case in which a user wishes to execute a predetermined function with a TV, other than a broadcast reception function, the broadcast reception function is inevitably executed first.

To address this problem, a method is needed for a TV to readily execute a desired function when booted.

SUMMARY

Exemplary embodiments may address at least the above problems, disadvantages, and/or other disadvantages not described above. Also, the exemplary embodiments are not required to overcome the disadvantages described above and an exemplary embodiment may not overcome any of the problems described above.

The exemplary embodiments provide a display device which receives and stores a remote control signal during a standby mode, and is booted to readily display a display screen corresponding to the remote control signal in response to the receipt of a power signal within a predetermined period of time of the receipt of the remote control signal, and a booting method of the display device.

The exemplary embodiments also provide a display device which receives a remote control signal and a power signal for a predefined period of time during a standby mode and is booted to readily display a display screen corresponding to the remote control signal, and a booting method of the display device.

According to an aspect of an exemplary embodiment, there is provided a booting method of a display device, including: during a standby mode, receiving a remote control signal and storing the remote control signal; and in response to a power signal being received within a predefined period of time of the receipt of the remote control signal, booting the display device to display a display screen corresponding to the remote control signal.

The booting method may also include, in response to no power signal being received within the predefined period of time of the receipt of the remote control signal, resetting the stored remote control signal.

The booting method may also include, in response to the receipt and storing of the remote control signal, generating a notification of the receipt of the remote control signal using at least one of a lamp and a speaker that are included in the display device.

The generating of a notification may include varying a manner in which the notification of the receipt of the remote control signal is generated depending on the type of the remote control signal.

The receiving may include receiving a plurality of remote control signals, and the display screen corresponds to a combination of the plurality of remote control signals.

In response to the remote control signal being a web browsing execution command, the display screen may be a web browser screen.

In response to the remote control signal being an application execution command, the display screen may be an application execution screen.

In response to the remote control signal being a content execution command, the display screen may be a content execution screen.

In response to the remote control signal being a channel selection signal for selecting a channel number, the display screen may be a broadcast screen corresponding to the selected channel number.

The booting method may also include displaying a user interface (UI) for matching a function of the display device with the remote control signal.

According to another aspect of an exemplary embodiment, there is provided a display device including: a communication unit which communicates with an external remote control; a storage unit which stores a remote control signal that is received from the remote control; a display unit; and a control unit which controls the storage unit to store the remote control signal in response to the receipt of the remote control signal during a standby mode, and boots the display unit to display a display screen corresponding to the remote control signal in response to a power signal being received within a predefined period of time of the receipt of the remote control signal.

The control unit may reset the remote control in the storage unit in response to no power signal being received within the predefined period of time of the receipt of the remote control signal.

In response to the receipt and storing of the remote control signal, the control unit may generate a notification the receipt of the remote control signal using at least one of a lamp and a speaker that are included in the display device.

The control unit may control the lamp and the speaker to vary a manner in which the notification of the receipt of the remote control signal is generated depending on the type of the remote control signal.

The display device may receive a plurality of remote control signals from the remote control, and the display screen may correspond to a combination of the plurality of remote control signals.

In response to the remote control signal being a web browsing execution command, the display screen may be a web browser screen.

In response to the remote control signal being an application execution command, the display screen may be an application execution screen.

In response to the remote control signal being a content execution command, the display screen may be a content execution screen.

In response to the remote control signal being a channel selection signal for selecting a channel number, the display screen may be a broadcast screen corresponding to the selected channel number.

The control unit may control the display unit to display a UI for matching a function of the display device to the remote control signal.

According to another aspect of an exemplary embodiment, there is provided a booting method of a display device, including: receiving a remote control signal and a power signal within a predefined period of time during a standby mode; and booting the display device to display a display screen corresponding to the remote control signal.

The booting may include: in response to the remote control signal being received within a predefined period of time of the receipt of the power signal, booting the display device to readily display the display screen; and in response to no remote control signal being received within the predefined period of time of the receipt of the power signal, booting the display device to display a broadcast reception screen.

According to another aspect of an exemplary embodiment, there is provided a display device including: a communication unit which communicates with an external remote control; a storage unit which stores a remote control signal that is received from the remote control; a display unit; and a control unit which, in response to a remote control signal and a power signal being received within a predefined period of time during a standby mode, boots the display unit to readily display a display screen corresponding to the remote control signal.

The control unit may boot the display device to readily display the display screen in response to the remote control signal being received within a predefined period of time of the receipt of the power signal, and may boot the display device to display a broadcast reception screen in response to no remote control signal being received within the predefined period of time of the receipt of the power signal.

BRIEF DESCRIPTION OF THE DRAWINGS

The above and/or other aspects of the inventive concept will be more apparent by describing certain exemplary embodiments with reference to the accompanying drawings, in which.

DETAILED DESCRIPTION OF EXEMPLARY EMBODIMENTS

Figure 1:
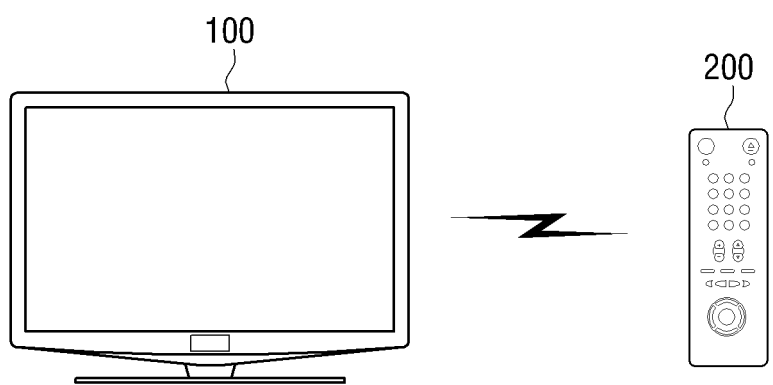
FIG. 1 is a diagram illustrating a display system according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the inventive concept. Thus, it is apparent that the exemplary embodiments can be carried out without those specifically defined matters. Also, well-known functions or constructions are not described in detail since they would obscure the exemplary embodiments with unnecessary detail.

FIG. 1 is a diagram illustrating a display system 10 according to an exemplary embodiment. Referring to FIG. 1, the display system 10 includes a display device 10 which displays an input image, and a remote control 200 which controls the display device 100. The display device 100 may be implemented as a smart television (TV), which provides various functions such as providing internet connections, applications and content (for example, music content, photos, video data, and the like).

In response to a predetermined button of the remote control 200 being pressed during a standby mode, the display device 100 may receive a corresponding remote control signal from the remote control 200. The predetermined button of the remote control 200 may correspond to a predetermined function of the display device 100. For example, button A of the remote control 200 may correspond to a web browsing function, button B of the remote control 200 may correspond to an application provision function, and button C of the remote control 200 may correspond to a content provision function. The correspondence between the functions of the display device 100 and the buttons of the remote control 200 may be set at the time of the manufacture of the display device 100 or may be set later by a user using a user interface (UI).

In response to the receipt of a remote control signal, the display device 100 may store information on the received remote control signal in a storage unit (not shown).

In response to the receipt of a remote control signal, the display device 100 may generate a notification of the receipt of the remote control signal using a lamp or a speaker that is provided on one side of the display device 100. The manner in which the display device 100 generates the notification of the receipt of a remote control signal may vary depending on the type of the remote control signal. For example, in response to the receipt of a remote control signal corresponding to button A, the display device 100 may turn on a blue lamp, or may output a message that reads "A" via a speaker. For example, in response to the receipt of a remote control signal corresponding to button B, the display device 100 may turn on a red lamp, or may output a message that reads "B" via a speaker.

In response to the receipt of a remote control signal, the display device 100 may determine whether a power signal is received within a predefined period of time of the receipt of the remote control signal. For example, the term 'power signal' indicates a signal received from the remote control 200 in response to a power button of the remote control 200 being pressed, or may be a signal generated in the display device 100 in response to a power button of the display device 100 being pressed.

In a case in which a power signal is received within the predefined period of time of the receipt of a remote control signal, the display device 100 may be booted to display a display screen corresponding to the remote control signal. For example, in response to the receipt of a remote control signal corresponding to button A, the display device 100 may be booted to display a web browser screen. For example, in response to the receipt of a remote control signal corresponding to button B, the display device 100 may be booted to display an application execution screen. For example, in response to the receipt of a remote control signal corresponding to button C, the display device 100 may be booted to display a content provision screen.

In a case in which no power signal is received within the predefined period of time of the receipt of a remote control signal, which is currently present in the storage unit, the display device 100 may reset the remote control signal, and may control the lamp indicating the receipt of the corresponding remote control signal to be turned off.

Figure 2:
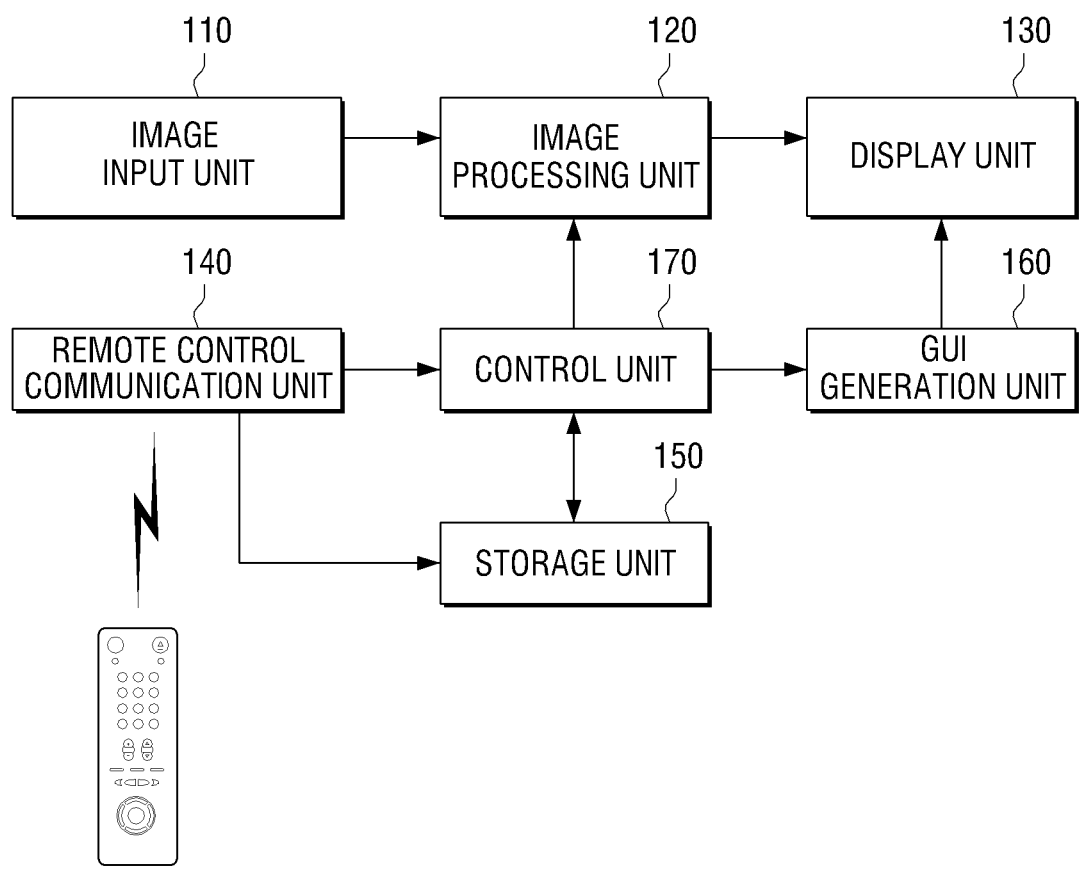
FIG. 2 is a block diagram illustrating a display device according to an exemplary embodiment.

The structure and the operation of the display device 100 are further described with reference to FIG. 2. Referring to FIG. 2, the display device 100 includes an image input unit 110, an image processing unit 120, a display unit 130, a remote control communication unit 140, a storage unit 150, a graphic UI (GUI) generation unit 160, and a control unit 170.

The image input unit 110 may receive an input image signal from a broadcasting station or a source device (for example, a digital versatile disc (DVD) or the like) using a wired or wireless connection.

The image processing unit 120 may perform signal processing on the input image signal such that the input image signal may be displayed. For example, the image processing unit 120 may perform signal processing such as decoding, scaling, and the like on the input image signal.

The display unit 130 may output the image processed by the image processing unit 120. The display unit 130 may display a GUI generated by the GUI generation unit 160 as an on-screen display (OSD).

The remote control communication unit 140 may receive various remote control signals and a power signal from the remote control 200.

The storage unit 150 may store various data for driving the display device 100 such as various multimedia data and the like. The storage unit 150 may store the correspondence between various remote control signals and various functions of the display device 100. The storage unit 150 may temporarily store a remote control signal that is received by the remote control communication unit 140 during a standby mode.

A nonvolatile storage medium such as, for example, a hard disk or a volatile storage medium such as, for example, a random-access memory (RAM) may be used as the storage unit 150.

The GUI generation unit 160 may generate a GUI for performing various settings for the display device 100 or receiving various user inputs. The GUI generation unit 160 may generate a UI for matching a function of the display device 100 to a remote control signal.

The control unit 170 may use a processor to control the general functions of the display device 100 in accordance with various user commands that may be received via various user input devices. In response to the receipt of a power signal within a predefined period of time of the receipt of a remote control signal, the control unit 170 may boot the display device 100 to display a display screen corresponding to the remote control signal.

In response to the receipt of a remote control signal from the remote control 200 during a standby mode, the control unit 170 may control the remote control signal to be stored in the storage unit 150. For example, a plurality of remote control signals may be received from the remote control 200 in series within a predefined period of time. In this example, the control unit 170 may store all the received remote control signals in the storage unit 150.

Figure 3:
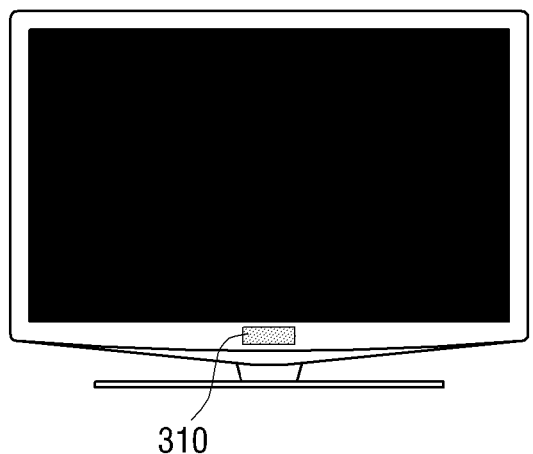
FIG. 3 is a diagram illustrating a notification of the receipt of a remote control signal.

In response to the receipt of a remote control signal, the control unit 170 may generate a notification of the receipt of the remote control signal in various manners. For example, referring to FIG. 3, in response to the receipt of a remote control signal, the control unit 170 may turn on a lamp 310, which is provided at the center of a lower portion of the bezel of the display device 100. The location of the lamp 310 is not restricted to that illustrated in FIG. 3.

The lamp 310 may be configured to emit different colors of light in response to different buttons of the remote control 200 being pressed. For example, in response to the receipt of a remote control signal corresponding to button A, the lamp 310 may emit blue light. For example, in response to the receipt of a remote control signal corresponding to button B, the lamp 310 may emit red light. For example, in response to the receipt of a remote control signal corresponding to button C, the lamp 310 may emit green light. The color of light emitted by the lamp 310 is not restricted to blue, red, and green. That is, the lamp 310 may be configured to emit various colors of light, other than blue, red and green light.

In another example, the control unit 170 may generate a notification the receipt of a remote control signal using a speaker (not shown). In response to the receipt of a remote control signal, the control unit 170 may control the speaker to output predetermined sound data (for example, a beeping sound). The control unit 170 may control the speaker to output different sounds in response to different buttons of the remote control 200 being pressed.

In another example, icons representing the functions of the display device 100 may be displayed on a TV panel, and the control unit 170 may be configured to turn on the lamp 310 or a lamp (not shown) provided on the remote control 200 in response to each of the icons being pressed.

In response to the receipt of a remote control signal, the control unit 170 may determine whether a power signal is received within a predefined period of time of the receipt of the remote control signal. For example, the term 'power signal' indicates a signal received from the remote control 200 in response to a power button of the remote control 200 being pressed, or may be a signal generated in the display device 100 in response to a power button on the bezel of the display device 100 being pressed.

For example, the predefined period of time may be, but is not limited to, one second. The predefined period of time may be set at the time of the manufacture of the display device 100 or may be set later by the user.

In a case in which it is determined that a power signal is received within the predefined period of time of the receipt of a remote control signal, the control unit 170 may boot the display device 100 to display a display screen corresponding to the remote control signal.

Figure 4A:
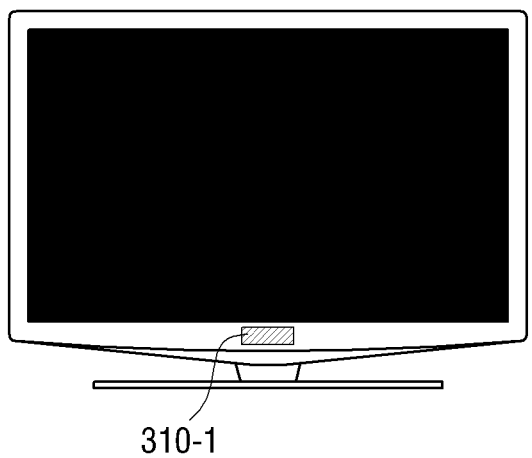
FIGS. 4A and 4B are diagrams illustrating booting a display device in response to the receipt of a web browsing execution command as a remote control signal.
Figure 4B:
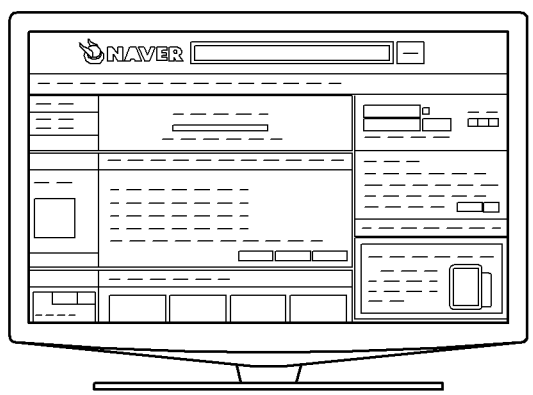

For example, in response to button A being pressed by the user, the control unit 170 may control the remote control communication unit 140 to receive a remote control signal corresponding to button A, and may control a lamp 310-1 to emit light of a first color, as shown in FIG. 4A. In response to the receipt of a power signal within the predefined period of time of the receipt of the remote control signal, the control unit 170 may boot the display device 100 to display a web browser screen to provide a function corresponding to button A, i.e., a web browsing function, as shown in FIG. 4B. The web browser screen may be a default web browser screen for providing the web browsing function.

Figure 5A:
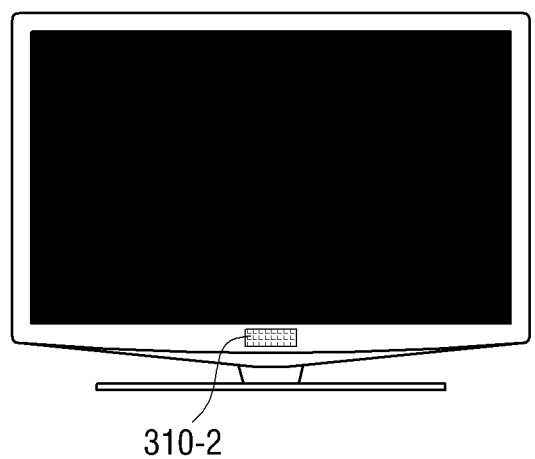
FIGS. 5A and 5B are diagrams illustrating booting a display device in response to the receipt of an application execution command as a remote control signal.
Figure 5B:
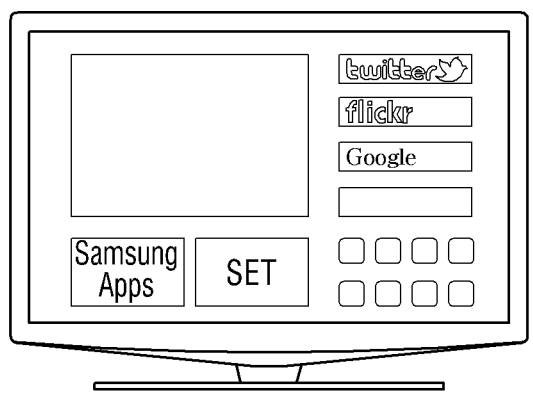

For example, in response to button B being pressed by the user, the control unit 170 may control the remote control communication unit 140 to receive a remote control signal corresponding to button B, and may control a lamp 310-2 to emit light of a second color, as shown in FIG. 5A. In response to the receipt of a power signal within the predefined period of time of the receipt of the remote control signal, the control unit 170 may boot the display device 100 to display an application execution screen to provide a function corresponding to button B, i.e., an application provision function, as shown in FIG. 5B. Referring to FIG. 5B, the application execution screen may display not only a menu of one or more applications installed in a TV but also an application advertisement menu and a menu for entering an application store.

Figure 6A:
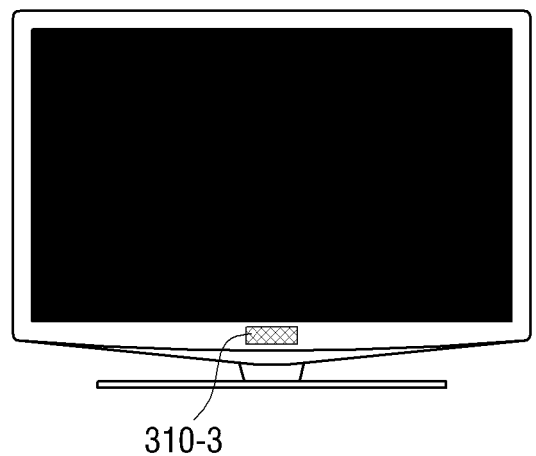
FIGS. 6A and 6B are diagrams illustrating booting a display device in response to the receipt of a content execution command as a remote control signal.
Figure 6B:
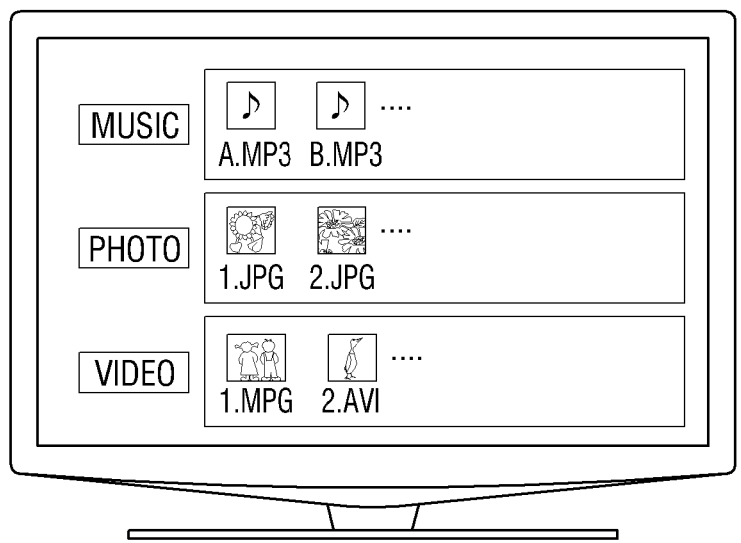

For example, in response to button C being pressed by the user, the control unit 170 may control the remote control communication unit 140 to receive a remote control signal corresponding to button C, and may control a lamp 310-3 to emit light of a third color, as shown in FIG. 6A. In response to the receipt of a power signal within the predefined period of time of the receipt of the remote control signal, the control unit 170 may boot the display device 100 to display a content provision screen to provide a function corresponding to button C, i.e., a content player function, as shown in FIG. 6B. Referring to FIG. 6B, the content provision screen may include a plurality of menus to provide a variety of content items such as, for example, music content, photo content and video content.

Figure 7A:
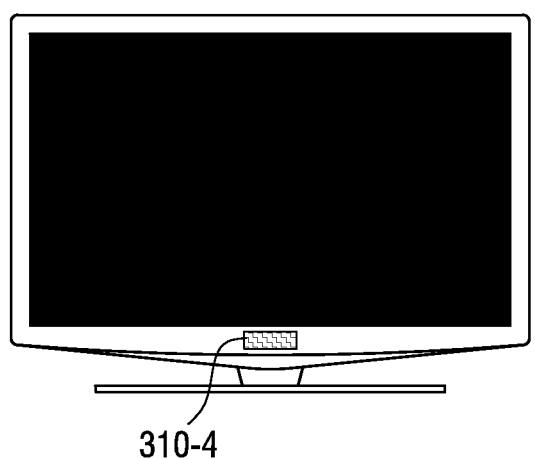
FIGS. 7A and 7B are diagrams illustrating booting a display device in response to the receipt of a channel selection command as a remote control signal.
Figure 7B:
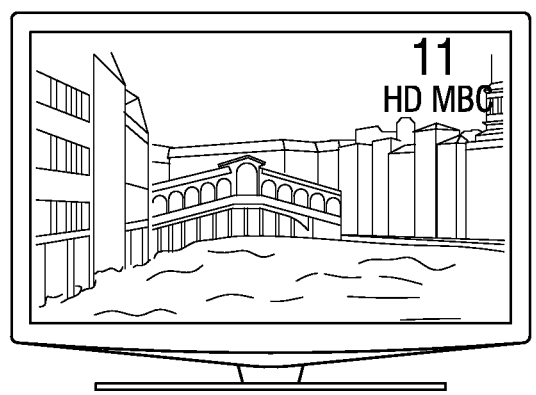

In another example, in response to button '1' of the remote control 200 being pressed twice by the user, the control unit 170 may control the remote control communication unit 140 to receive a remote control signal corresponding to button '1' twice, and may control the lamp 310-4 to emit light of a fourth color, as shown in FIG. 7A. In response to the receipt of a power signal within the predefined period of time of the receipt of the remote control signal, the control unit 170 may boot the display device 100 to select a broadcast signal from channel 11, to perform signal processing on the selected broadcast signal, and to display the processed broadcast signal, as shown in FIG. 7B.

Therefore, it is possible to match the functions of the display device 100 to the buttons of the remote control 200 and allow the display device 100 to perform its functions while being booted.

The examples illustrated in FIGS. 4A to 7B are merely exemplary. That is, not only may a browser screen, an application execution screen, and a content provision screen be readily provided to the user, but also a webpage, an application, and content may be readily provided to the user. For example, in response to the receipt of a power signal within a predefined period of time of the receipt of a first remote control signal, the control unit 170 may readily execute a webpage (for example, a news webpage, a search webpage or the like) corresponding to the first remote control signal. For example, in response to the receipt of a power signal within a predefined period of time of the receipt of a second remote control signal, the control unit 170 may readily execute an application (for example, a weather forecast application, a traffic information application or the like) corresponding to the second remote control signal. For example, in response to the receipt of a power signal within a predefined period of time of the receipt of a third remote control signal, the control unit 170 may control content (for example, movie content, music content or the like) corresponding to the third remote control signal to be readily executed.

In a case in which a plurality of remote control signals are received, the control unit 170 may control a display screen corresponding to the combination of the remote control signals to be displayed. For example, in response to buttons B and A being sequentially pressed by the user, remote control signals respectively corresponding to buttons B and A may be received. Then, in a case in which a power signal is received within a predefined period of time of the receipt of the remote control signals, the control unit 170 may control an application corresponding to the combination of the remote control signals (for example, a weather forecast application) to be readily executed.

In a case in which no power signal is received within a predefined period of time of the receipt of a remote control signal, which is currently present in the storage unit, the control unit 170 may reset the remote control signal. The control unit 170 may control an output device such as the lamp 310, which indicates the receipt of a remote control signal, to be turned off.

Figure 8:
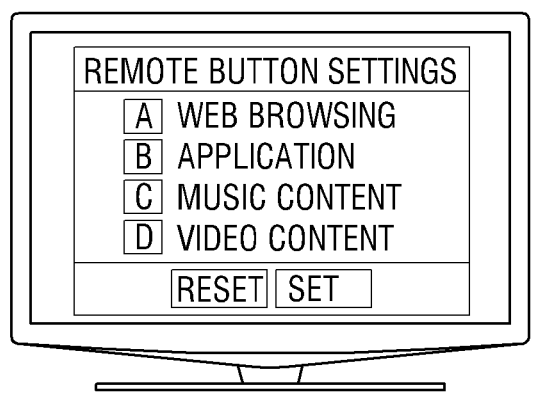
FIG. 8 is a diagram illustrating a user interface (UI) for matching functions to buttons of a remote control.

Referring to FIG. 8, the control unit 170 may provide a GUI for matching a function of the display device 100 to a remote control signal. For example, to modify settings regarding button A, the user may select button A, and may set a desired function to be associated with button A.

As described above, when booted, the display device 100 may readily perform a function corresponding to a remote control signal input thereto, while a related-art display device displays a broadcast reception screen when booted.

An example of booting the display device 100 is described with reference to FIG. 9.

Figure 9:
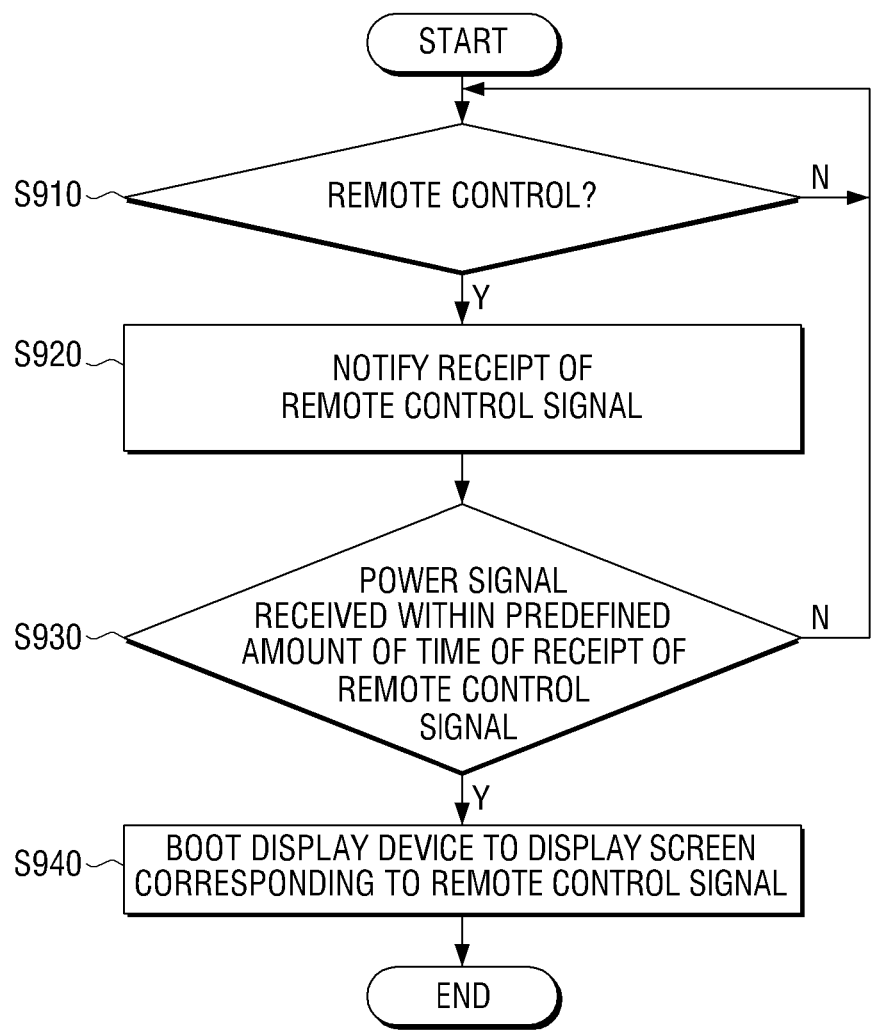
FIG. 9 is a flowchart illustrating a booting method of a display device, according to an exemplary embodiment.

FIG. 9 is a flowchart illustrating a booting method of the display device 100, according to an exemplary embodiment.

Referring to FIG. 9, the display device 100 may determine whether there is a remote control signal received from the remote control 200 (S910). The remote control signal may correspond to a function of the display device 100. For example, in response to the remote control signal being a signal generated by button A of the remote control 200, the remote control signal may correspond to a web browsing function. For example, in response to the received remote control signal being a signal generated by button B of the remote control 200, the remote control signal may correspond to an application provision function. For example, in response to the remote control signal being a signal generated by button C of the remote control 200, the remote control signal may correspond to a content provision function. The correspondence between the remote control signal and a function of the display device 100 may be set at the time of the manufacture of the display device 100, or may be set later by a user using, for example, the UI illustrated in FIG. 8. The display device 100 may store the remote control signal in the storage unit.

In response to the receipt of the remote control signal from the remote control 200 (S910—Y), the display device 100 may generate a notification of the receipt of the remote control signal (S920) by using, for example, a lamp or a speaker that may be provided on one side of the display device 100. The manner in which the display device 100 may generate the notification of the receipt of the remote control signal may vary depending on the type of the remote control signal.

The display device 100 may determine whether a power signal is received within a predefined period of time of the receipt of the remote control signal (S930). The power signal may be a signal received from the remote control 200 in response to a power button of the remote control 200 being pressed, or may be a signal generated in the display device 100 in response to a power button provided on the display device 200 being pressed.

In response to the power signal being received within the predefined period of time of the receipt of the remote control signal (S930—Y), the display device 100 may be booted to display a display screen corresponding to the remote control signal (S940). For example, in response to the remote control signal corresponding to button A, the display device 100 may be booted to display a web browser screen. For example, in response to the remote control signal corresponding to button B, the display device 100 may be booted to display an application execution screen. For example, in response to the remote control signal corresponding to button C, the display device 100 may be booted to display a content provision screen.

In response to no power signal being received within the predefined period of time of the receipt of the remote control signal (S930—N), the display device 100 may reset the remote control signal, which is currently present in the storage unit, and may await the receipt of another remote control signal.

According to the example illustrated in FIG. 9, it is possible for the user to readily execute a desired function when booting the display device 100.

Another example of booting the display device 100 is described with reference to FIG. 10.

Figure 10:
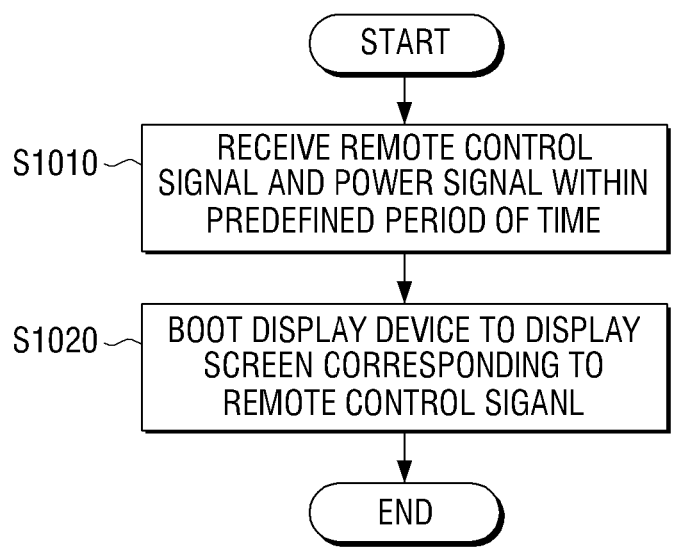
FIG. 10 is a flowchart illustrating a booting method of a display device, according to another exemplary embodiment.

FIG. 10 is a flowchart illustrating a booting method of the display device 100, according to another exemplary embodiment.

Referring to FIG. 10, the display device 100 may receive a remote control signal and a power signal within a predefined period of time (S1010). For example, the display device 100 may receive the remote control signal first and may then receive the power signal within a predefined period of time of the receipt of the remote control signal. In another example, the display device 100 may receive the power signal first and may then receive the remote control signal within a predefined period of time of the receipt of the power signal.

In response to the remote control signal being received before the receipt of the power signal, the display device 100 may generate a notification of the receipt of the remote control signal using a lamp or a speaker provided on one side of the bezel thereof.

In response to the power signal being received before the receipt of the remote control signal, the display device 100 may display an idle screen for a predefined period of time, instead of displaying a broadcast reception screen.

In response to the receipt of the remote control signal and the power signal within a predefined period of time, the display device 100 may be booted to display a display screen corresponding to the remote control signal (S1020) in the same manner as described above with reference to FIG. 9.

In response to the power signal being received first and the remote control signal being received within a predefined period of time of the receipt of the power signal, the display device 100 may be booted to display a display screen corresponding to the remote control signal. On the other hand, in response to no remote control signal being received within the predefined period of time of the receipt of the power signal, the display device 100 may be booted to display a broadcast reception screen.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A booting method of a display device, comprising:
   receiving a remote control signal and storing the remote control signal during a standby mode;
   booting the display device to display a display screen corresponding to the remote control signal when a power signal is received within a predefined period of time following the receiving of the remote control signal; and
   resetting the stored remote control signal when no power signal is received within the predefined period of time following the receiving of the remote control signal.

2. The booting method as claimed in claim 1, further comprising:
   generating a notification of the receiving of the remote control signal using at least one of a lamp and a speaker in response to the receiving and storing of the remote control signal.

3. The booting method as claimed in claim 2, wherein the generating a notification of the receiving of the remote control signal varies depending on a type of the remote control signal.

4. The booting method as claimed in claim 1, wherein the receiving of the remote control signal comprises receiving a plurality of the remote control signals within the predefined period of time, and the display screen corresponds to a combination of the plurality of the remote control signals.

5. The booting method as claimed in claim 1, wherein the display screen is a web browser screen when the remote control signal is a web browsing execution command.

6. The booting method as claimed in claim 1, wherein the display screen is an application execution screen when the remote control signal is an application execution command.

7. The booting method as claimed in claim 1, wherein the display screen is a content execution screen when the remote control signal is a content execution command.

8. The booting method as claimed in claim 1, wherein the display screen is a broadcast screen corresponding to the selected channel number when the remote control signal is a channel selection signal for selecting a channel number.

9. The booting method as claimed in claim 1, further comprising:
   displaying a user interface (UI) for matching a function of the display device with the remote control signal.

10. A display device comprising:
    a communication unit which communicates with a remote control;
    a storage unit;
    a display unit; and
    a control unit which controls the storage unit to store the remote control signal in response to receiving a remote control signal during a standby mode, and boots the display unit to display a display screen corresponding to the remote control signal when receiving a power signal within a predefined period of time of the receiving of the remote control signal,
    wherein the control unit resets the remote control signal in the storage unit when no power signal is received within the predefined period of time of the receiving of the remote control signal.

11. The display device of claim 10, wherein the control unit generates a notification of the receiving of the remote control signal using at least one of a lamp and a speaker that are included in the display device in response to the receiving and storing of the remote control signal.

12. The display device as claimed in claim 11, wherein the control unit controls the lamp and the speaker to vary the notification of the receiving of the remote control signal depending on the type of the remote control signal.

13. The display device as claimed in claim 10, wherein when the display device receives a plurality of remote control signals from the remote control within the predefined period of time, the display screen corresponds to a combination of the plurality of remote control signals.

14. The display device as claimed in claim 10, wherein the display screen is a web browser screen when the remote control signal is a web browsing execution command.

15. The display device as claimed in claim 10, wherein the display screen is an application execution screen when the remote control signal is an application execution command.

16. The display device as claimed in claim 10, wherein the display screen is a content execution screen when the remote control signal is a content execution command.

17. The display device as claimed in claim 10, wherein the display screen is a broadcast screen corresponding to the selected channel number when the remote control signal is a channel selection signal for selecting a channel number.

18. The display device as claimed in claim 10, wherein the control unit controls the display unit to display a UI for matching a function of the display device with the remote control signal.

19. A booting method of a display device, comprising:
receiving a remote control signal and a power signal;
booting the display device to display a display screen corresponding to the remote control signal when the remote control signal and the power signal are received within a predefined period of time; and
booting the display device to display a broadcast reception screen when the remote control signal and the power signal are not received within the predefined period of time.

20. A display device comprising:
a communication unit which communicates with a remote control;
a storage unit which stores a remote control signal that is received from the remote control;
a display unit; and
a control unit which boots the display unit to display a display screen corresponding to the remote control signal when the remote control signal is received within a predefined period of time of when a power signal is received during a standby mode,
wherein the control unit boots the display device to display a broadcast reception screen when no remote control signal is received within the predefined period of time of the receipt of the power signal.

\* \* \* \* \*